(12) United States Patent
Hurewitz et al.

(10) Patent No.: US 11,429,879 B2
(45) Date of Patent: Aug. 30, 2022

(54) METHODS AND SYSTEMS FOR IDENTIFYING DYNAMIC THEMATIC RELATIONSHIPS AS A FUNCTION OF TIME

(71) Applicant: UBS Business Solutions AG, Zurich (CH)

(72) Inventors: Barry Scott Hurewitz, New York, NY (US); Hanoz Bhathena, New York, NY (US); Prashanth Jeganathen, Basking Ridge, NJ (US); Omar Moustafa, Brooklyn, NY (US)

(73) Assignee: UBS Business Solutions AG, Zurich (CH)

( * ) Notice: Subject to any disclaimer, the term of this patent is extended or adjusted under 35 U.S.C. 154(b) by 297 days.

(21) Appl. No.: 15/930,072

(22) Filed: May 12, 2020

(65) Prior Publication Data

US 2021/0357773 A1  Nov. 18, 2021

(51) Int. Cl.
*G06N 5/04* (2006.01)
*G06F 16/248* (2019.01)
*G06N 20/00* (2019.01)

(52) U.S. Cl.
CPC ............ *G06N 5/04* (2013.01); *G06F 16/248* (2019.01); *G06N 20/00* (2019.01)

(58) Field of Classification Search
None
See application file for complete search history.

(56) References Cited

U.S. PATENT DOCUMENTS

| 5,515,488 | A | 5/1996 | Hoppe et al. |
|---|---|---|---|
| 6,006,225 | A | 12/1999 | Bowman et al. |
| 6,041,331 | A | 3/2000 | Weiner et al. |
| 8,176,440 | B2 | 5/2012 | Stading |
| 8,402,035 | B2 | 3/2013 | Artzt et al. |
| 8,407,232 | B2 | 3/2013 | Nozaki |
| 8,694,530 | B2 | 4/2014 | Musgrove |
| 2009/0055368 | A1 | 2/2009 | Rewari et al. |
| 2010/0082604 | A1* | 4/2010 | Gutt ................... G06F 16/3326 707/E17.014 |
| 2010/0082649 | A1* | 4/2010 | Gutt ...................... G06F 16/951 707/E17.014 |
| 2010/0287175 | A1* | 11/2010 | Beaudreau .......... G06F 16/3331 707/769 |
| 2013/0103712 | A1* | 4/2013 | Li ....................... G06F 16/9032 707/769 |
| 2014/0280015 | A1* | 9/2014 | Marantz .............. G06F 16/1767 707/710 |
| 2015/0074101 | A1 | 3/2015 | Solheim et al. |
| 2016/0246805 | A1* | 8/2016 | Long ................. G06F 16/90324 |
| 2018/0060419 | A1* | 3/2018 | Xie ..................... G06F 16/3322 |

(Continued)

OTHER PUBLICATIONS

Food Waste—Explore—Google Trends [online]. Google [retrieved on Feb. 19, 2020]. Retrieved from the Internet: <URL https://trends.google.com/trends/explore?date=all&geo=US&q=food%20waste>.

*Primary Examiner* — Toan H Vu

(74) *Attorney, Agent, or Firm* — Pillsbury Winthrop Shaw Pittman LLP

(57) ABSTRACT

Methods and systems are described herein for improvements to identifying thematic relationships in data sets using machine learning models. In particular, the methods and systems describe a way to identify dynamic thematic relationships (e.g., thematic relationships that may change as a function of time) as a function of time.

20 Claims, 7 Drawing Sheets

(56) References Cited

U.S. PATENT DOCUMENTS

| | | | |
|---|---|---|---|
| 2018/0137195 A1* | 5/2018 | Zou | G06F 16/3334 |
| 2018/0217672 A1* | 8/2018 | Ito | G06F 1/163 |
| 2018/0232461 A1* | 8/2018 | Fu | G06F 16/90344 |
| 2018/0307727 A1* | 10/2018 | Lucas | G06F 16/24553 |
| 2019/0391992 A1 | 12/2019 | Shah et al. | |
| 2020/0334307 A1* | 10/2020 | Prasad | G06F 16/24578 |

* cited by examiner

METHODS AND SYSTEMS FOR IDENTIFYING DYNAMIC THEMATIC RELATIONSHIPS AS A FUNCTION OF TIME

FIELD OF THE INVENTION

The invention relates to identifying dynamic thematic relationships as a function of time using machine learning models.

BACKGROUND

As data sets are continually increasing, users are increasingly looking for automated methods of parsing and summarizing those data sets. To do so, an understanding of thematic relationships (e.g., how words or phrases are related to each other) is important, as large data sets that feature various character strings (e.g., words) each have thematic relationships to other character strings. Furthermore, as data sets expand exponentially, manual determination of these thematic relationships is increasingly difficult.

SUMMARY

Methods and systems are described herein for improvements to identifying thematic relationships in data sets using machine learning models. In particular, the methods and systems describe a way to identify dynamic thematic relationships (e.g., thematic relationships that may change as a function of time). For example, conventional techniques for identifying thematic relationships may do so based on a static data set. This is particularly true for systems that identify thematic relationship using machine learning models. For example, a conventional machine learning model may be trained to classify a word into a given theme using a set of training data. However, by doing so, the resulting system is also static. That is, the model is only accurate as long as the underlying data does not change. Such a static system is impractical in today's world of ever-evolving terminology. That is, new language, new terms, and new ideas are constantly evolving and being expressed in different ways. The use of static data sets prevents the system from accurately processes the new terminology and new uses of terminology. This problem is only exacerbated in applications requiring more than simply character string (e.g., word) detection such as application that must understand the context of the character string and/or the context of the data within which the character string is found.

Likewise, using training data sets without a large date range prevents a user form observing trends in that data, as the data is all particular to the same date range. For example, training Accordingly, methods and systems are described herein for identifying dynamic thematic relationships in temporally varying data sets using machine learning models.

For example, to account for the issues created based on constantly evolving terminology and thematic relationships, the methods and systems disclosed herein train the machine model using temporally relevant training data to determine thematic relationships at a given time. For example, the system may train a machine learning model to determine a thematic relationship for a term during a first time period using training data from that time period (e.g., training data published during the first time period). The system may then train the machine learning model (or a different model) to determine a thematic relationship for a term during a second time period using training data from that time period (e.g., training data published during the second time period). Accordingly, the limitations based on static data are overcome.

For example, in the context of a website, the system may retrieve a first data set comprising the content of the website on a first date or time (e.g., using a digital archive that stores prior versions of the website that corresponds to the first date or time). The system may then retrieve a second data set comprising the content of the website on a second date or time (e.g., using the digital archive that stores prior versions of the website that corresponds to the second date or time). The system may then scrape content from the website on the first and second date and generate the first data set and the second data set respectively. The system may then train a machine learning model to determine thematic relationships between the character strings (e.g., words in the content from the website). These thematic relationships and/or the theme groups resulting from the thematic relationship may change from the first date to the second date, reflecting the changes in terminology, opinion, and sentiment related to each word. The system may then, within a single user interface, allow a user to query a character string to determine the number of mentions of the search term, the number of mentions of character strings in its theme group, and/or sentiments related to the search term and the terms in its theme group. Moreover, the system may generate alerts based on this information. For example, the system may continuously monitor (e.g., at a user-selected time increment) for changes to a sentiment, subject matter or entities (e.g., a company, person, etc.) for which a sentiment may be changes, and/or degrees of change (e.g., changes in sentiment above a given threshold) related to a sentiment.

The system may then provide an additional benefit of aggregating this information into a format that is easily consumable and navigable by a user. For example, the system may aggregate the information into a graph showing trends related to the mentions of the search term, the number of mentions of character strings in its theme group, and/or sentiments related to the search term and the terms in its theme group. Moreover, the user interface may include features that allow the user to modify the underlying data (e.g., search terms and/or terms in the theme group), filter for particular categories of data (e.g., data ranges, sources of mentions, and/or sentiment attached to a term), and/or other affect characteristics of the user interface and/or the thematic search of the queried search term. Accordingly, the system may generate a user interface the allows for the generation, navigation, and consumption of data and information in a format that was previously unavailable to a user.

In some aspects, methods and systems are described for identifying dynamic thematic relationships in temporally varying data sets using machine learning models. For example, the system may retrieve, using control circuitry, a first data set, wherein the first data set corresponds to a first time period. The system may retrieve, using the control circuitry, a second data set, wherein the second data set corresponds to a second time period. The system may receive, using the control circuitry, a first character string query from a user. The system may access, using the control circuitry, a machine learning model trained to: determine a first plurality of thematic relationships between a plurality of character strings at the first time period based on the first data set; and determine a second plurality of thematic relationships between the plurality of character strings at the second time period based on the second data set. The system may determine, using the control circuitry, a first theme group for the first character string query based on the first plurality of thematic relationships, wherein the first theme group corresponds to the first time period in a third data set. The system may determine, using the control circuitry, a second theme group for the first character string query based on the second plurality of thematic relationships, wherein the second theme group corresponds to the second time period in the third data set. The system may generate for display, on a user interface, a thematic search of the first character string query over the first time period and the second time period based on the first theme group and the second theme group.

In some aspects, methods and systems are described for performing curated thematic searches. For example, the system may receive a first user input of a first character string. The system may determine a theme group for the first character string, wherein the theme group comprises the first character string and a plurality of character strings having a thematic relationship to the first character string as determined by a machine learning model. The system may receive a second user input selecting a subset of the theme group for performing a thematic search. The system may receive a third user input selecting a data source for the thematic search. The system may generate for display, using the control circuitry, a graphical representation of the thematic search, wherein the graphical representation indicates a number of appearances, in the data source, of character strings in the subset as a function of time.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention. It should also be noted that the methods and systems disclosed herein are also suitable for applications unrelated to source code programming.

Figure 1:
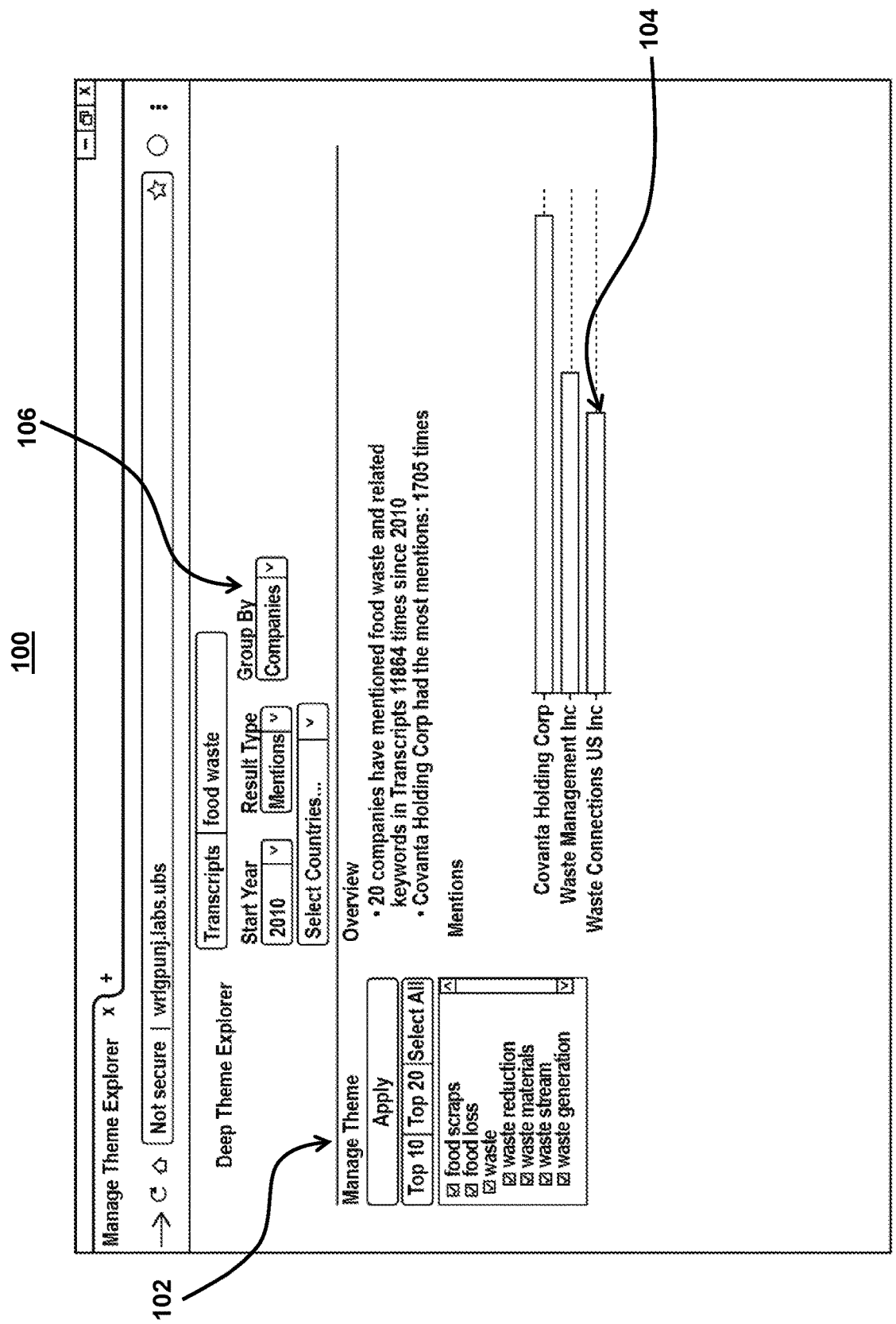
FIG. 1 shows an illustrative user interface for presenting dynamic thematic relationships as a function of time, in accordance with one or more embodiments.

FIG. 1 shows an illustrative user interface for presenting dynamic thematic relationships as a function of time, in accordance with one or more embodiments. For example, the system and methods described herein may generate for display, on a local display device (e.g., user device 422 and 424 (FIG. 4) described below), a user interface for presenting thematic searches. For example, user interface 100 (FIG. 1) may include a graphical representation in a first portion of a user interface, an option for selecting the subset in a second portion of the user interface and an option for selecting the data source in a third portion of the user interface.

For example, user interface 100 shows thematic search 104. As described herein, a thematic search may include an analysis with a temporal component. For example, the thematic search may be a temporal statistical analysis which models the behavior of a variable in a data set over time (e.g., to determine whether and how concentrations are changing over time). For example, thematic search 104 may track data over a time period to indicate trends in the data. As shown in FIG. 1, in some embodiments, thematic search 104 may comprise a graphical representation of the thematic search. For example, the graphical representation may comprise plotting of different valves of variables on a graph, which gives the movement or a change in the variable over a period of time.

In one example, the variable may be the presence or mentioning of a character string (or character strings in a theme group) in one or more data sets. In another example, the variable may be a document, article, and/or other data source that include the character string (or character strings in a theme group). For example, the variable may be a number of appearances, in a data source, of character strings in a selected subset of a theme group, an article, document, etc. containing a character string, etc. Additionally or alternatively, the graphical representation may include other characteristics.

As described herein, a "characteristic" may include any information about a thematic search and/or data used to generate the thematic search that may be used to categorize the thematic search and/or data used to generate the thematic search and/or distinguish the thematic search and/or data used to generate the thematic search form other thematic searches or data. For example, characteristics of a thematic search may include any information about the content (e.g., a character string query) as well as any information within the data set search. For example, characteristics may be source, subject matter, time period, etc. A characteristic may also include a sentiment or entity attached to a character string in a data set (e.g., as described below in relation to FIG. 3).

Thematic search 104 may be based on one or more options related to the training of a machine learning model used to generate thematic search 104, related to modifying a display of thematic search 104, and/or related to another characteristic of thematic search 104. For example, option 102 may list character strings in a theme group for a character string query input into user interface 100 by a user. The character strings in the theme group may be based on a plurality of thematic relationships determined by a machine learning model.

Using user interface 100, the system may receive user input indicating what character strings (e.g., determined to be thematical related to a character string query) should be used for the thematic search. For example, the system may receive a user input designating which character strings determined to be thematically related to an inputted character strings should be included in a theme group. It should be noted that the character strings in the theme group may change based on a user selection (or de-selection) of a given character string via option 102. In some embodiments, the character strings shown in option 102 may change as a machine learning model determines new thematic relationships between character strings.

For example, as the terminology, meaning, and frequency of use change for character strings (e.g., words), the system may determine new character strings that are thematically related to an inputted character strings (or remove old character strings that are no longer thematically related to an inputted character string). For example, a machine learning model may determine a first plurality of thematic relationships between a plurality of character strings at a first time period (e.g., for the month of April) by training on a first data set (e.g., a digital archive of data published by a data source in April). The machine learning model may then determine a second plurality of thematic relationships between the plurality of character strings at a second time period (e.g., for the month of May) by training on a second data set (e.g., a digital archive of data published by a data source in May). By retraining the model each month, and updating the thematic relationship underlying the theme group, the system ensures that as the terminology, meaning, and frequency of use change for character strings (e.g., words), the system adapts to the change.

In some embodiments, options 102 may also allow a user to select groups of character strings and/or subsets with another subset of a theme group. The system may further characterize and/or categorize different character strings in order to allow a user to efficiently navigate and select character strings. In some embodiments, the system may further recommend groups of character strings (e.g., "Top Ten") based on trends and/or user preferences.

In some embodiments, the system may store a library of thematic searches and/or character strings. A user may access the library to perform searches for different queries. Additionally or alternatively, the system may automatically run one or more searches automatically and/or at predetermined times or frequencies. For example, the system may continually run searches in the background of the system to generate alerts for one or more entities and/or subject matter. The library may further include groups and/or categories for the libraries, and these groups and categories may be selected an accessed by a user. For example, the system may receive a search query from a user and the user may select one or more thematic searches for a library to use for the entity and/or subject matter of the search query. Additionally or alternatively, the system may allow a user to apply Boolean operators for thematic searches from the library. Moreover, the system may identify emerging themes and/or sentiments as well as groups of thematic searches that are returning similar results (e.g., for a given entity). The system may then return results based on the emerging and/or similar results. These results may be in the form of alerts for entities and/or subject matter found in the result or the thematic searches that are returning the similar results. For example, the system may identify convergence between entities, subject matter, sentiments for the entities or subject matter, keywords, and/or other characteristics of a search. The system may also find entities that are increasingly appear in a given thematic search (e.g., an emerging industry).

User interface 100 may also include option 106. Option 106 may allow a user to filter data and/or other characteristics. For example, the system may filter the thematic search 104 and/or the data in thematic search 104 (or used to train a machine learning model upon which thematic search 104 is based) using option 106. For example, using option 106, the system may receive a user input of a character string query, a relevant time period (e.g., a time and/or range of time). For example, user interface 100 may include thematic search 104 in a first window, an option for modifying criteria used to generate the thematic search in a second window (e.g., option 102), and an option for modifying how thematic search 104 is displayed in a third window (e.g., option 106).

For example, option 106 may allow a user to filter the thematic search based on a time period (e.g., a month, date, year), a data source (e.g., a given digital archive, a given website, a given governmental database, a given news outlet, etc.), a type of data source (e.g., a type of digital archive, a type of website, a type of governmental database, a type of a news outlet, etc.), an entity (e.g., a given company, a given person, a given industry, etc.), a type of entity (e.g., a type of company, a type of person, a type of industry, etc.), a sentiment (e.g., a positive, negative, and/or neutral sentiment), a location within a data (e.g., a particular section of a document, a particular section of a webpage, a particular section of news content, a particular subject matter/topic, etc.), and/or based on one or more preexisting tags in the data set (e.g., tags automatically related data to a time period, data source, type of data source, entity, type of entity, and/or sentiment. Moreover, the system may generate alerts based on this information. For example, the system may continuously monitor (e.g., at a user-selected time increment) for changes to a sentiment, subject matter or entities (e.g., a company, person, etc.) for which a sentiment may be changes, and/or degrees of change (e.g., changes in sentiment above a given threshold) related to a sentiment. The alert may be configured using multiple criteria to determine when, where, how, and/or to whom an alert is generated.

In some embodiments, option 106 may also allow the user to establish other rules and/or use Boolean operators. For example, the system may allow a user to filter the thematic search based on the proximity, in the data (e.g., an article, webpage, etc.) of a character string in the theme group to an entity (e.g., a company, topic, subject, industry, etc.). Similarly, the Boolean operators may be used to generate alerts based on thematic searches and/or alerts.

As described herein, a thematic relationship may include thematic relationships in a linguistic sense. For example, the thematic relationship may represent a noun phrase may play with respect to the action or state described by a governing verb, commonly the sentence's main verb. Alternatively, a thematic relationship may refer to the frequency at which one character string appears with another character string in a data set (e.g., on a webpage, in a news article, etc.). Alternatively, a thematic relationship may comprise the results of a determination of a string-searching/string-matching algorithm that counts one or more strings (or string patterns) within a larger string or text (e.g., a data set).

In some embodiments, the system may base the thematic relationship based on the closeness of text strings. For example, the system may find strings that match a pattern approximately (rather than exact match). The system may perform this operation in two steps. First, the system may find approximate substring matches inside a given string. The system may then find dictionary strings (or other database strings) that match the pattern approximately.

Alternatively or additionally, thematic relationships may be based on fuzzy logic which may determine that two fields and/or values to be related even though the substance of the data or value (e.g., two different spellings) is not identical. Alternatively, or additionally, the system may determine the thematic closeness of character stings. For example, in some embodiments, the system may receive a labeled character string and train the machine learning model to classify the labeled character string into a selected classification. For example, the machine learning model may perform a text classification where given text is assigned to one or more fixed sets of classes/categories.

In some embodiments, the system may retrieve a plurality of character strings, wherein the plurality of character strings are unlabeled, and group the plurality of character strings based on similarities between respective character strings of the plurality of character strings into the first plurality of thematic relationships and the second plurality of thematic relationships. For example, the machine learning model may perform a text clustering operation where a set of unlabeled texts are grouped (e.g., into a cluster) based on one or more similarities to each other. The system may cluster based on particular similarity being present, a number of similarities, and/or other factors. This operation may be unsupervised.

As referred to herein, a character string may be a linear sequence of characters, typically one stored in or processed by a computer. The characters may be alphanumeric. For example, character string may represent a word, name, etc. As referred to herein, a data set may include a collection of related sets of information that is composed of separate elements but can be manipulated as a unit by a computer. The data set may be based on one or more sources and/or correspond to a data organization and/or structure of one or more sources. The sources of the data may correspond to original sources (e.g., content creators), secondary sources (e.g., content providers), and/or other sources (e.g., content aggregators, archivers, etc.). For example, content may include content aggregated from one or more sources (e.g., content scraped from a web site).

The methods and systems described herein may generate a thematic search based on this information. For example, the system and methods may detect a character string (or thematically related character string) and generate an alert for other content indicating mentions of that character string and/or related character strings as a function of time. For example, the methods and systems may indicate a trend of the character string and its thematically related character strings. An "alert," as described herein, may be any communication to a user that apprises the user of one or more mentions. For example, the system may generate alerts based on a character string and its thematically related character strings as well as changes to a sentiment and/or entity related to a sentiment change. For example, the system may continuously monitor (e.g., at a user-selected time increment) for changes to a sentiment, subject matter or entities (e.g., a company, person, etc.) for which a sentiment may be changes, and/or degrees of change (e.g., changes in sentiment above a given threshold) related to a sentiment. The system may generate the alert based on one or more criteria. The criteria may relate to a threshold for generating the alert, a frequency of an alert (or related search), an attribute for the alert (e.g., how and to whom the alert is issued), and/or one or more characteristics relating to a sentiment and/or thematic search that triggers the alert.

As referred to herein, the "content" may include any electronically consumable content, such as television programming, as well as pay-per-view programs, on-demand programs (as in video-on-demand (VOD) systems), Internet content (e.g., streaming content, downloadable content, Webcasts, etc.), video clips, audio content, information, pictures, rotating images, documents, playlists, websites, articles, books, electronic books, blogs, advertisements, chat sessions, social media, applications, games, and/or any other media or multimedia and/or combination of the same.

Figure 2:
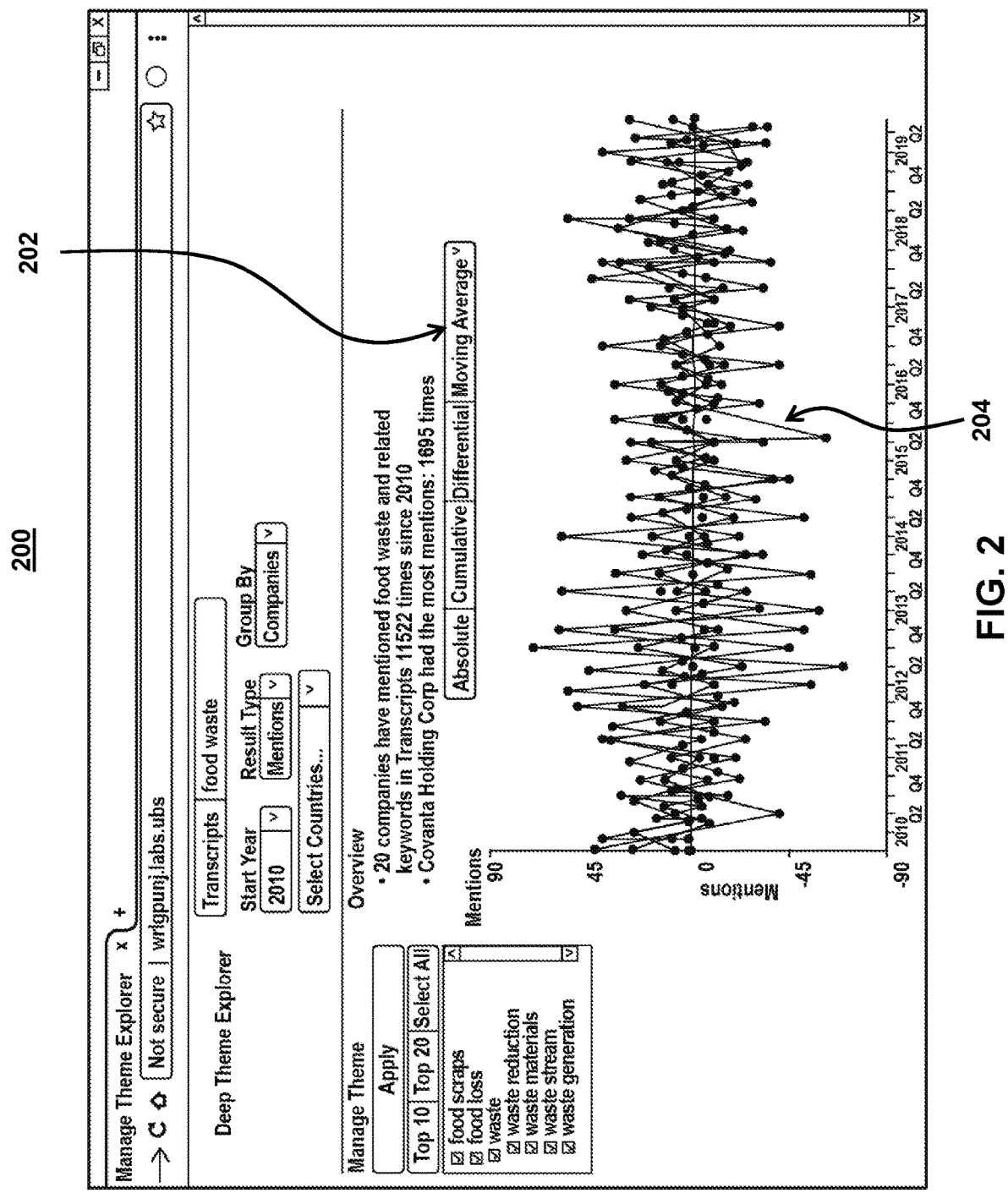
FIG. 2 shows another illustrative user interface for presenting dynamic thematic relationships as a function of time, in accordance with one or more embodiments.

FIG. 2 shows another illustrative user interface for presenting dynamic thematic relationships as a function of time, in accordance with one or more embodiments. For example, the system and methods described herein may generate for display, on a local display device (e.g., user device 422 and 424 (FIG. 4) described below), a user interface for presenting a thematic search. For example, FIG. 2 displays user interface 200. User interface 200 may represent an exemplary user interface for identifying dynamic thematic relationships in temporally varying data sets using machine learning models.

For example, as shown in FIG. 2, user interface 200 includes thematic search 204. Thematic search 204 include a selectable graphical representation of a trend related to a character string query. It should be noted that while a thematic search may appear as a graphical representation, a textual representation (e.g., describing a quantitative or qualitative aspect of a trend, mention, and/or other data related to a character string query), and/or a multimedia presentation.

Figure 3:
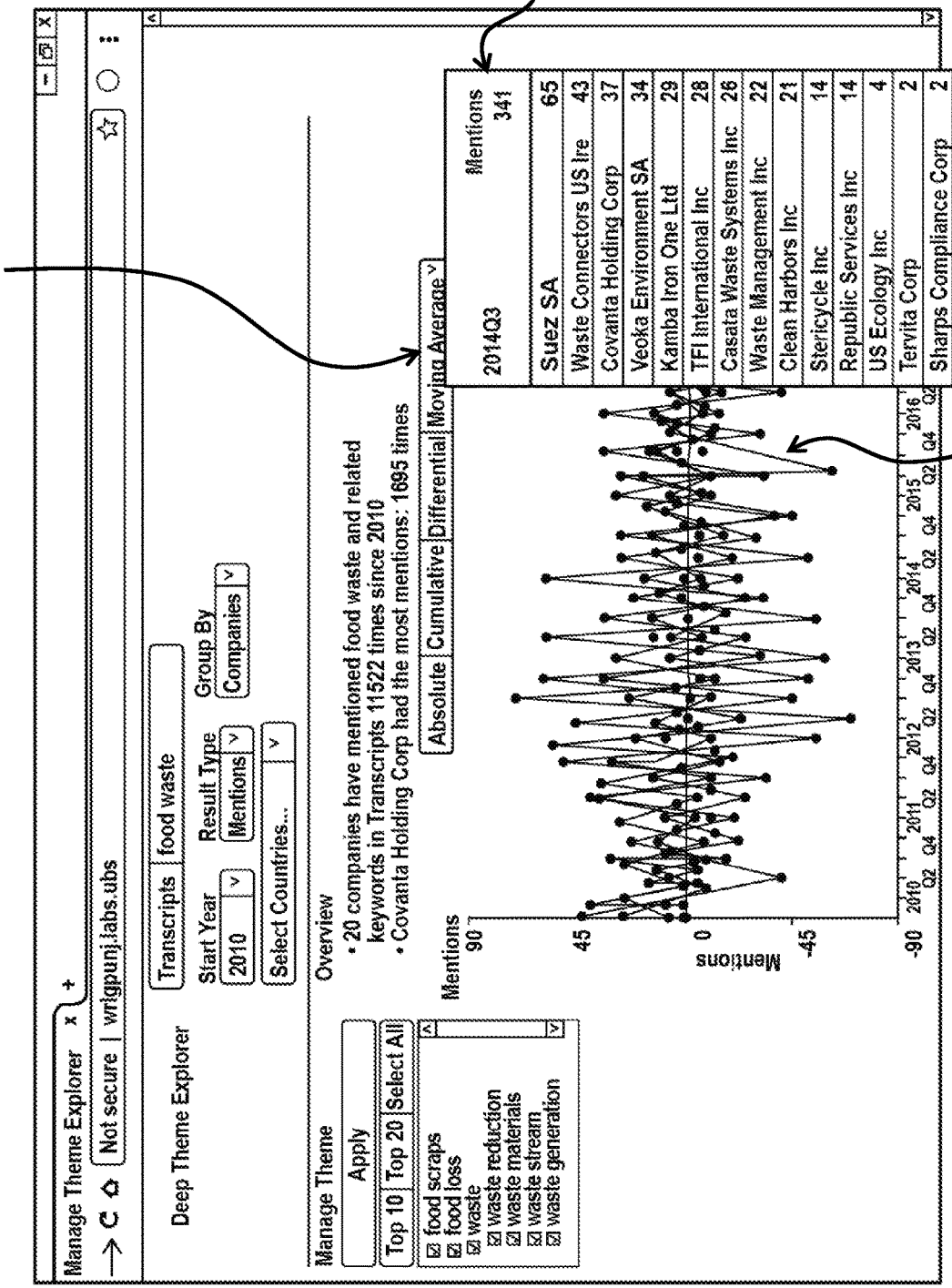
FIG. 3 shows another illustrative user interface for presenting dynamic thematic relationships as a function of time, in accordance with one or more embodiments.

Thematic search 204 also include point 202. Point 202 is a selectable point in thematic search 204, selection of which may cause additional information related to point 202 to appear (e.g., as shown in FIG. 3). For example, the system may allow a user to hover a cursor over a node in a thematic search and view underlying details about point 202 in the thematic search.

Additional information may include a sentiment attached to the character string. Sentiment can be tracked over time. For example, the system may provide a sentiment analysis on the underlying text based on the theme group. For example, the system may parse each sentence (or other grouping) surrounding a character string and identify words or other character stings that have sentimental bearing (e.g., keywords with a positive, negative or neutral sentiment). The system may then determine a sentiment of these keywords. The sentiment may be assigned to the character string within a particular proximity and/or data (e.g., document, article, etc.) within which the sentiment keyword is found.

For example, in one embodiment, user interface 200 may present a thematic search based on the mentions of a search word in news publication. For example, the system may receive a user request to review the trends related to a topic. In this case, the system may retrieve a first data set comprising the content of one or more news publications on a first date or time (e.g., using a digital archive that stores prior versions of the website that corresponds to the first date or time). The system may then retrieve a second data set comprising the content of the website on a second date or time (e.g., using the digital archive that stores prior versions of the website that corresponds to the second date or time).

The system may retrieve this content using web scraping and/or aggregation tool. Alternatively or additionally, the system may identify prior versions of content and tag the content retrieved from the prior versions with the first and second date. The system may then filter a database of based on the first or second data depending on which set of data the system intends to use to train a machine learning model.

The system may then train a machine learning model to determine thematic relationships between the character strings (e.g., words in the content from the website). These thematic relationships and/or the theme groups resulting from the thematic relationship may change from the first date to the second date, reflecting the changes in terminology, opinion, and sentiment related to each word. The system may then, within a single user interface, allow a user to query a character string to determine the number of mentions of the search term, the number of mentions of character strings in its theme group, and/or sentiments related to the search term and the terms in its theme group. For example, the system may determine how a sentiment about a given topic has changed over a date range.

The system may then provide an additional benefit of aggregating this information into a format that is easily consumable and navigable by a user (e.g., as shown in thematic search 204). For example, the system may aggregate the information into a graph showing trends related to the mentions of the search term, the number of mentions of character strings in its theme group, and/or sentiments related to the search term and the terms in its theme group. Moreover, user interface 200 may include features that allow the user to modify the underlying data (e.g., search terms and/or terms in the theme group) such as option 102 (FIG. 1)), filter for particular categories of data (e.g., data ranges, sources of mentions, and/or sentiment attached to a term) option 106 (FIG. 1)), and/or other affect characteristics of user interface 200 and/or the thematic search 204 of a queried search term.

FIG. 3 shows another illustrative user interface for presenting dynamic thematic relationships as a function of time, in accordance with one or more embodiments. For example, the system and methods described herein may generate for display, on a local display device (e.g., user device 422 and 424 (FIG. 4) described below), a user interface for an integrated project management system. Through user interface 300, the system, may receive a user request to present a thematic search (e.g., as shown in user interface 100 (FIG. 1) above) and/or perform one or more operations (e.g., as shown in user interface 200 (FIG. 2) above), such as identifying dynamic thematic relationships in temporally varying data sets using machine learning models.

For example, the system may receive a first user input of a first character string (e.g., "virus"). The system may determine a theme group for the first character string (e.g., "COVID-19", "Wuhan", etc.), wherein the theme group comprises the first character string and a plurality of character strings having a thematic relationship to the first character string as determined by a machine learning model (e.g., based on training data derived from a news outlet). The system may receive a second user input selecting a subset of the theme group for performing a thematic search (e.g., "COVID-19"). The system may receive a third user input selecting a data source for the thematic search (e.g., a governmental database). The system may generate for display a graphical representation (e.g., a bar graph, scatter, plot, etc.) of the thematic search (e.g., thematic search 302), wherein the graphical representation indicates a number of appearances, in the data source, of character strings in the subset (e.g., "COVID-19") as a function of time (occurring each month).

As shown in FIG. 3, the system has received a user selection of point 302. In response, the system has generated supplemental content 304. Supplemental content may include additional information related to point 302, such as the data underlying point 302 in the thematic search. In some embodiments, the system may find themes and/or categories of thematic searches that are emerging for given entities and/or subject matter. For example, the system may identify industries, companies, people, or regions for which thematic searches are increasingly returning. The system may also identify the underlying text sources that are being searched.

For example, the system may utilize a trained model (e.g., as described below in FIG. 4) such that a search word or phrase (e.g., a character string query is expanded into a theme group) (e.g., a collection of search terms). The system may train the model by periodically scanning one or more data sets (e.g., corpuses of text such as online encyclopedias and news sources) to train the model to identify relationships between terms (words or phrases) to be searched. The system may then use the model to identify similarities and relationships (e.g., closeness) between terms, and rank those related terms, such that terms that frequently occur together and/or are in close proximity to each other are ranked as highly correlated.

The system may then use the trained model to conduct a thematic search. For example, the system may receive user inputs of a search query (a term or phrase) as a character string query, and the trained model may present the user (e.g., via user interface 300) with a list of potentially related/correlated terms (or "keywords"). The system may then allow the user to select a subset of keywords from the list (e.g., as shown in option 102 (FIG. 1)) and use that subset of keywords to develop a theme group to be used for a search. The system may also allow a user to sub-select from the keyword terms.

Based on the theme created by the user, the system may search the theme (e.g., comprising selected keywords) within user-selected source materials, such as transcripts, financial reports, news, or other publications relevant to the theme, within a desired timeframe. The system may then determine the number of mentions, or the number of documents that the particular theme appeared in in connection with particular companies or industries. The results be further modified by the system such that as by a desired time frame so that trends in such mentions are shown.

In some embodiments, the system may allow a user to access native data and/or data in different formats through further selections. For example, in response to a user selection of an item in supplemental content 304, the system may retrieve native data (e.g., as presented in the data from the data source) and/or allow a user to modify the format of the data. For example, the system may generate a spreadsheet of native data (e.g., as shown in thematic search 442 (FIG. 4)).

Figure 4:
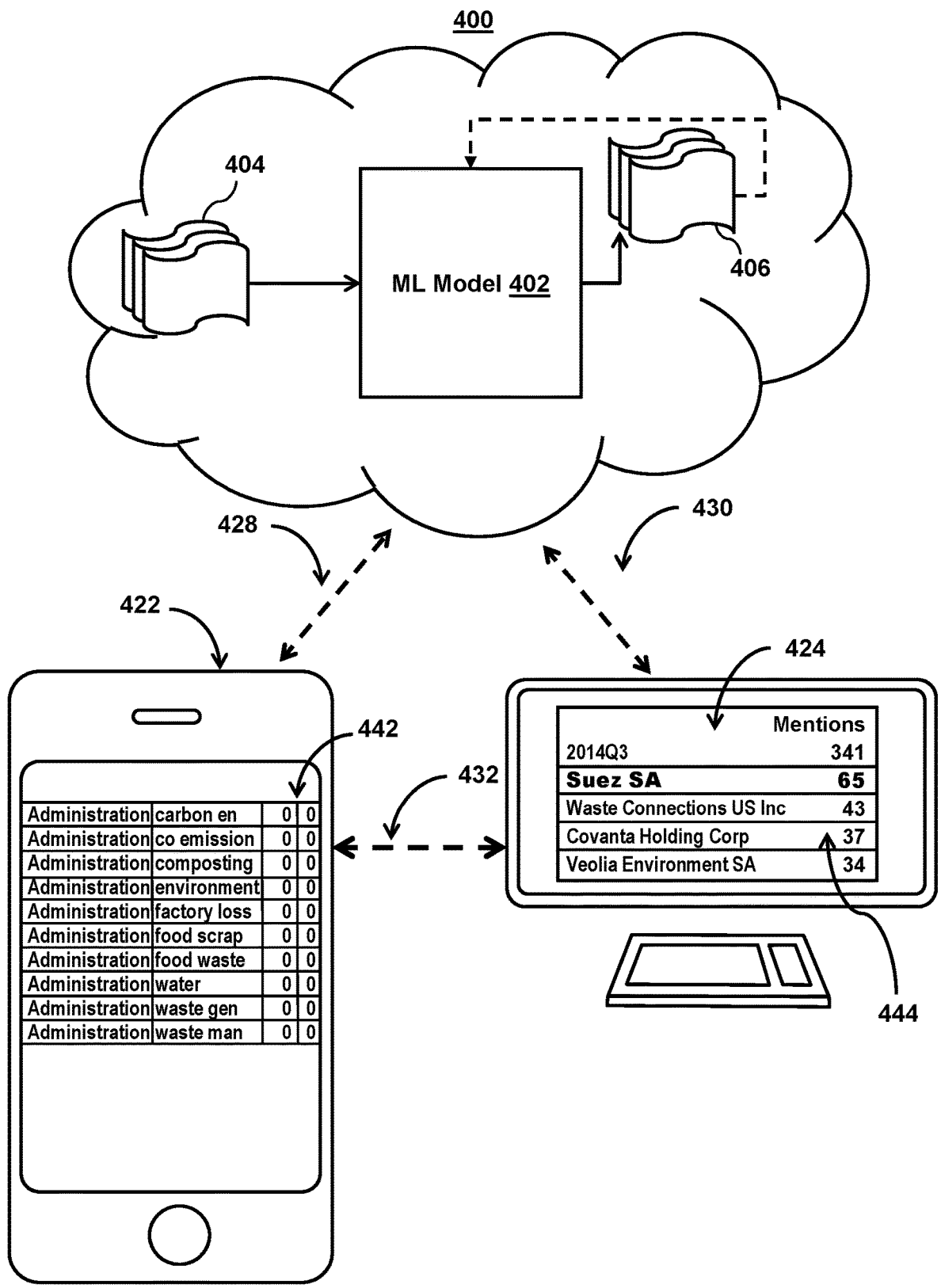
FIG. 4 shows an illustrative system for identifying dynamic thematic relationships as a function of time using machine learning models, in accordance with one or more embodiments.

FIG. 4 shows an illustrative system for identifying dynamic thematic relationships as a function of time using machine learning models, in accordance with one or more embodiments. As shown in FIG. 4, system 400 may include user device 422, user device 424, and/or other components. Each user device may include any type of mobile terminal, fixed terminal, or other device. Each of these devices may receive content and data via input/output (hereinafter "I/O") paths and may also include processors and/or control circuitry to send and receive commands, requests, and other suitable data using the I/O paths. The control circuitry may be comprised of any suitable processing circuitry. Each of these devices may also include a user input interface and/or display for use in receiving and displaying data (e.g., user interface 100 (FIG. 1)). For example, thematic search 442 and 444 are currently displayed on device 422 and user device 424.

By way of example, user device 422 and user device 424 may include a desktop computer, a server, or other client device. Users may, for instance, utilize one or more of the user devices to interact with one another, one or more servers, or other components of system 400. It should be noted that, while one or more operations are described herein as being performed by particular components of system 400, those operations may, in some embodiments, be performed by other components of system 400. As an example, while one or more operations are described herein as being performed by components of user device 422, those operations may, in some embodiments, be performed by components of user device 424. System 400 also includes machine learning model 402, which may be implemented on user device 422 and user device 424, or accessible by communication paths 428 and 430, respectively. It should be noted that, although some embodiments are described herein with respect to machine learning models, other prediction models (e.g., statistical models or other analytics models) may be used in lieu of, or in addition to, machine learning models in other embodiments (e.g., a statistical model replacing a machine learning model and a non-statistical model replacing a non-machine learning model in one or more embodiments).

Each of these devices may also include memory in the form of electronic storage. The electronic storage may include non-transitory storage media that electronically stores information. The electronic storage of media may include (i) system storage that is provided integrally (e.g., substantially non-removable) with servers or client devices and/or (ii) removable storage that is removably connectable to the servers or client devices via, for example, a port (e.g., a USB port, a firewire port, etc.) or a drive (e.g., a disk drive, etc.). The electronic storage methods may include optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic methods may include virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

For example, one or more of the components of system 400 may include cloud-based components (e.g., cloud-based memory, cloud-based control circuitry, cloud-based I/O circuitry, etc.). For example, cloud-based memory may be configured to: store a first data set, wherein the first data set corresponds to a first time period, and wherein first values of the first data set correspond to respective values published by a source in the first time period; and store a second data set, wherein the second data set corresponds to a second time period, and wherein second values of the second data set correspond to respective values published by the source in the second time period. Cloud-based control circuitry may be configured to: determine a first theme group for a first character string query based on a first plurality of thematic relationships determined based on a machine learning model, wherein the first theme group corresponds to the first time period in a third data set; and determine a second theme group for a first character string query based on a second plurality of thematic relationships determined based on the machine learning model, wherein the second theme group corresponds to the second time period in the third data set. Cloud-based I/O circuitry may be configured to generate for display a thematic search of the first character string query over the first time period and the second time period based on the first theme group and the second theme group.

FIG. 4 also includes communication paths 428, 430, and 432. Communication paths 428, 430, and 432 may include the Internet, a mobile phone network, a mobile voice or data network (e.g., a 4G or LTE network), a cable network, a public switched telephone network, or other types of communications network or combinations of communications networks. Communication paths 428, 430, and 432 may include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

As an example, with respect to FIG. 4, machine learning model 402 may take inputs 404 and provide outputs 406. The inputs may include multiple data sets such as a training data set and a test data set. Each of the plurality of data sets (e.g., inputs 404) may include data subsets with common characteristics. The common characteristics may include characteristics about a character string, data set, and/or other feature. In some embodiments, outputs 406 may be fed back to machine learning model 402 as input to train machine learning model 402 (e.g., alone or in conjunction with user indications of the accuracy of outputs 406, labels associated with the inputs, or with other reference feedback information). In another embodiment, machine learning model 402 may update its configurations (e.g., weights, biases, or other parameters) based on the assessment of its prediction (e.g., outputs 406) and reference feedback information (e.g., user indication of accuracy, reference labels, or other information). In another embodiment, where machine learning model 402 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, the machine learning model 402 may be trained to generate better predictions. For example, in some embodiments, machine learning model 402 may be trained to a identify a plurality of thematic relationships between a plurality of character strings at a given time period in a data set.

In some embodiments, machine learning model 402 may include an artificial neural network. In such embodiments, machine learning model 402 may include input layer and one or more hidden layers. Each neural unit of machine learning model 402 may be connected with many other neural units of machine learning model 402. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function such that the signal must surpass before it propagates to other neural units. Machine learning model 402 may be self-learning and trained, rather than explicitly programmed, and can perform significantly better in certain areas of problem solving, as compared to traditional computer programs. During training, an output layer of machine learning model 402 may corresponds to a classification of machine learning model 402 and an input known to correspond to that classification may be input into an input layer of machine learning model 402 during training. During testing, an input without a known classification may be input into the input layer, and a determined classification may be output.

In some embodiments, machine learning model 402 may include multiple layers (e.g., where a signal path traverses from front layers to back layers). In some embodiments, back propagation techniques may be utilized by machine learning model 402 where forward stimulation is used to reset weights on the "front" neural units. In some embodiments, stimulation and inhibition for machine learning model 402 may be more free flowing, with connections interacting in a more chaotic and complex fashion. During testing, an output layer of machine learning model 402 may indicate whether or not a given input corresponds to a classification of machine learning model 402 (e.g., a thematic relationship).

Figure 5:
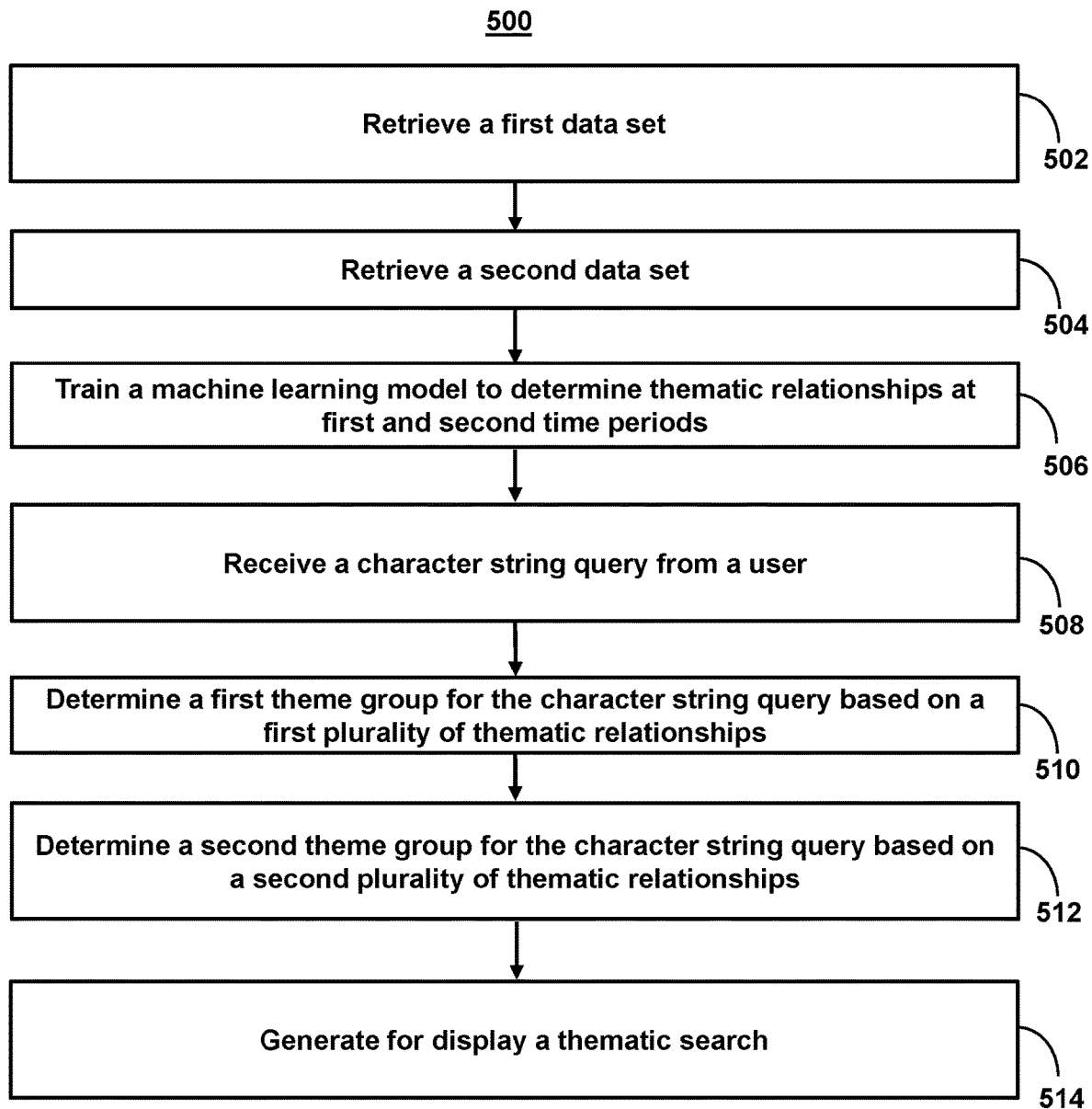
FIG. 5 shows flowchart of the steps involved in identifying dynamic thematic relationships as a function of time using machine learning models, in accordance with one or more embodiments.

FIG. 5 shows flowchart of the steps involved in identifying dynamic thematic relationships as a function of time using machine learning models, in accordance with one or more embodiments. For example, process 500 may represent the steps taken by one or more devices as shown in FIG. 4 when identifying dynamic thematic relationships in temporally varying data sets using machine learning models. In some embodiments, process 500 may be combined with one or more steps of process 600 (FIG. 6)). For example, the system may identifying dynamic thematic relationships in temporally varying data sets using machine learning models according to process 500, and then the system may use those dynamic thematic relationships to present a graphical representation based on the thematic relationship viewable through a user interface (e.g., user interface 100 (FIG. 1)) according to process 600.

At step 502, process 500 retrieves (e.g., using control circuitry of one or more components of system 400 (FIG. 4)) a first data set. For example, the system may retrieve a first data set, wherein the first data set corresponds to a first time period. For example, the system may store a first data set, wherein the first data set corresponds to a first time period, and wherein first values of the first data set correspond to respective values published by a source in the first time period (e.g., the first values may comprise the content of a website, database, and/or other repository of information at a time corresponding to the first time period).

In some embodiments, the system may allow a user (e.g., via user interface 100 (FIG. 1)) to select a data set for training and/or using to generate a thematic search. The system may also receive user selections designating different time periods, ranges, and/or frequencies for use in training and/or generating the thematic search. For example, the system may receive a first user input b selecting the first time period and the first data set. For example, the system may receive a second user input by selecting the second time period and the second data set. For example, the system may receive a third user input by selecting the third data set. For example, the system may receive a fourth user input by selecting a third time period that comprises the first time period and the second time period.

At step 504, process 500 retrieves (e.g., using control circuitry of one or more components of system 400 (FIG. 4)) a second data set. For example, the system may retrieve a second data set, wherein the second data set corresponds to a second time period. For example, the system may store a second data set, wherein the second data set corresponds to a second time period, and wherein second values of the second data set corresponds to respective values published by the source in the second time period (e.g., the second values may comprise the content of the website, database, and/or other repository of information at a time corresponding to the second time period).

At step 506, process 500 receives (e.g., using control circuitry of one or more components of system 400 (FIG. 4)) a character string query from a user. For example, the system may receive a first character string query from a user (e.g., via user interface 100).

At step 508, process 500 accesses (e.g., using control circuitry of one or more components of system 400 (FIG. 4)) a machine learning model trained to determine thematic relationships at first and second time periods. For example, the system may train a machine learning model to determine a first plurality of thematic relationships between a plurality of character strings at the first time period based on the first data set and/or trained to determine a second plurality of thematic relationships between the plurality of character strings at the second time period based on the second data set.

For example, the system may use one or more machine learning models to determine the thematic relationships. In some embodiments, training the machine learning model may further comprise receiving a labeled character string and training the machine learning model to classify the labeled character string into a selected classification. For example, the machine learning model may perform a text classification where given text is assigned to one or more fixed sets of classes/categories. In some embodiments, training the machine learning model may further comprise retrieving the plurality of character strings, wherein the plurality of character strings are unlabeled, and grouping the plurality of character strings based on similarities between respective character strings of the plurality of character strings into the first plurality of thematic relationships and the second plurality of thematic relationships. For example, the machine learning model may perform a text clustering operation where a set of unlabeled texts are grouped (e.g., into a cluster) based on one or more similarities to each other. The system may cluster based on a particular similarity being present, a number of similarities, and/or other factors. This operation may be unsupervised. In some embodiments, the system may train the machine learning model based on the closeness of text strings. For example, the system may find strings that match a pattern approximately (rather than exact match). The system may perform this operation in two steps. First, the system may find approximate substring matches inside a given string. The system may then find dictionary strings (or other database strings) that match the pattern approximately.

In some embodiments, the system may also receive a user input selecting a training frequency. For example, the system may retrieve a training frequency (e.g., one week) for the machine learning model and select the first time period (e.g., corresponding to one week) and the second time period (e.g., also corresponding to one week) based on the training frequency. In some embodiments, the system may also allow a user to vary the frequency, and/or select frequencies that are different than time periods used to generate thematic search. For example, modifying the frequency may improve processing and response time.

In some embodiments, the system may find themes and/or categories of thematic searches that are emerging for given entities and/or subject matter. For example, the system may identify industries, companies, people, or regions for which thematic searches are increasingly returning. The system may also identify the underlying text sources that are being searched.

At step 510, process 500 determines (e.g., using control circuitry of one or more components of system 400 (FIG. 4)) a first theme group for the character string query based on the first plurality of thematic relationships. For example, the system may determine a first theme group for the first character string query based on the first plurality of thematic relationships, wherein the first theme group corresponds to the first time period in a third data set. The thematic relationship may indicate other character strings in the third data set, at the first time period, with a predetermined closeness to the first character string query. For example, a portion of the plurality of character strings in the first theme group may be different from a portion of the plurality of character strings in the second theme group, which may reflect the changing meaning and relationships of words.

At step 512, process 500 determines (e.g., using control circuitry of one or more components of system 400 (FIG. 4)) a second theme group for the character string query based on the second plurality of thematic relationships. For example, the system may determine a second theme group for the first character string query based on the second plurality of thematic relationships, wherein the second theme group corresponds to the second time period in the third data set. The thematic relationship may indicate other character strings in the third data set, at the second time period, with a predetermined closeness to the first character string query.

At step 514, process 500 generates (e.g., using control circuitry of one or more components of system 400 (FIG. 4)) a thematic search. For example, the system may generate for display, on a user interface, a thematic search of the first character string query over the first time period and the second time period based on the first theme group and the second theme group. For example, the thematic search may indicate a first frequency of the first theme group in the third data set during the first time period and a second frequency of the second theme group in the third data set during the second time period. The system may also include identifying emerging themes, themes related to given entities and/or subject matter, and/or sentiments and/or changes to sentiment within user set parameters. For example, if a user is tracking a particular company, the system may allow the user to create an alert to search through various sources at a given frequency. The alert may be triggered based on the particular company appearing, having a change in sentiment, and/or any other criteria as described herein.

In some embodiments, the system may store a library of thematic searches and/or character strings. A user may access the library to perform searches for different queries for a given entity, sentiment, and/or subject matter. Additionally or alternatively, the system may automatically run one or more searches automatically and/or at predetermined times or frequencies. For example, the system may continually run searches in the background of the system to generate alerts for one or more entities, sentiments, and/or subject matter (e.g., to determine what is trending).

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-4 could be used to perform one of more of the steps in FIG. 5.

Figure 6:
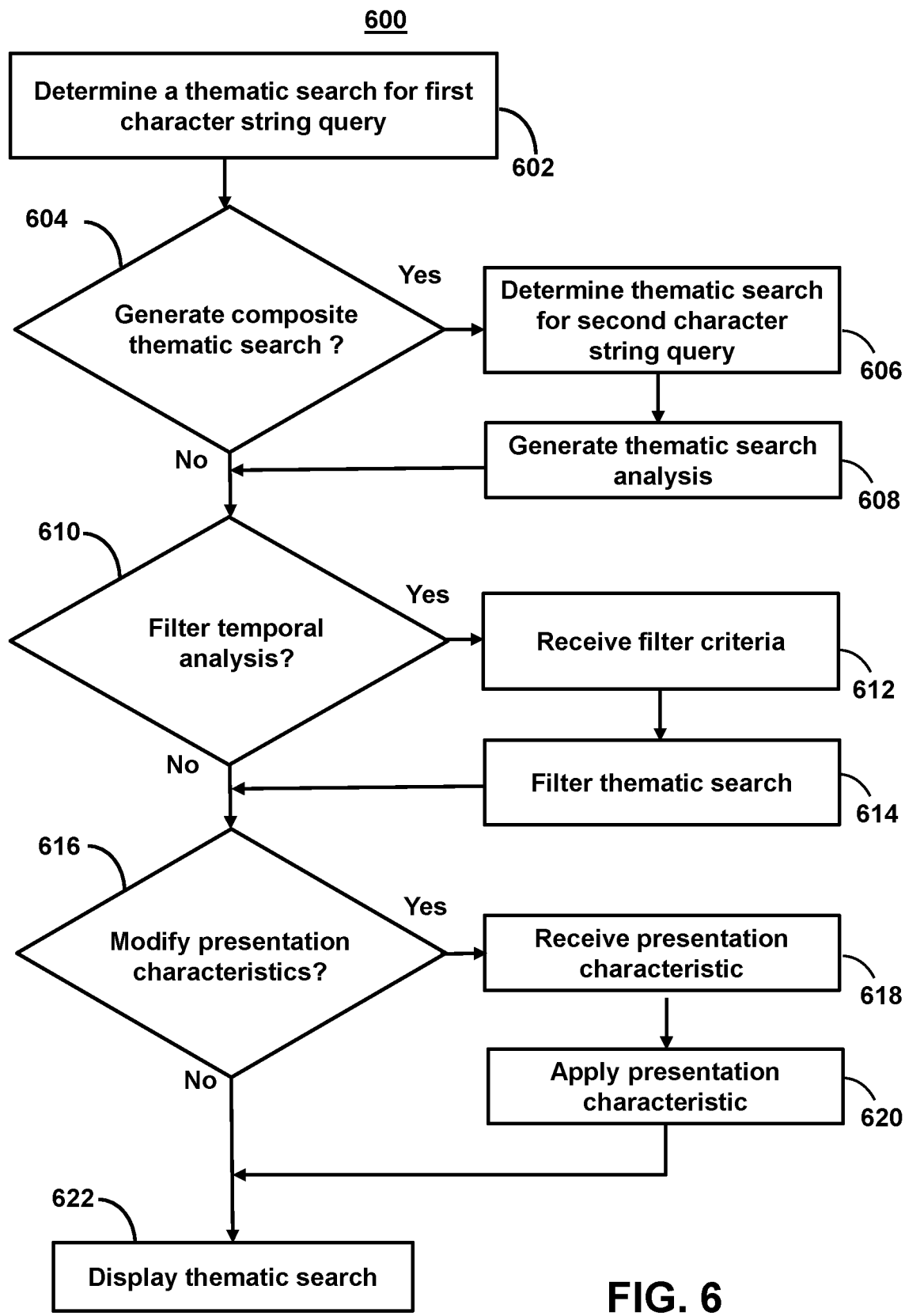
FIG. 6 shows a flowchart of the steps involved in presenting dynamic thematic relationships as a function of time, in accordance with one or more embodiments.
Figure 7:
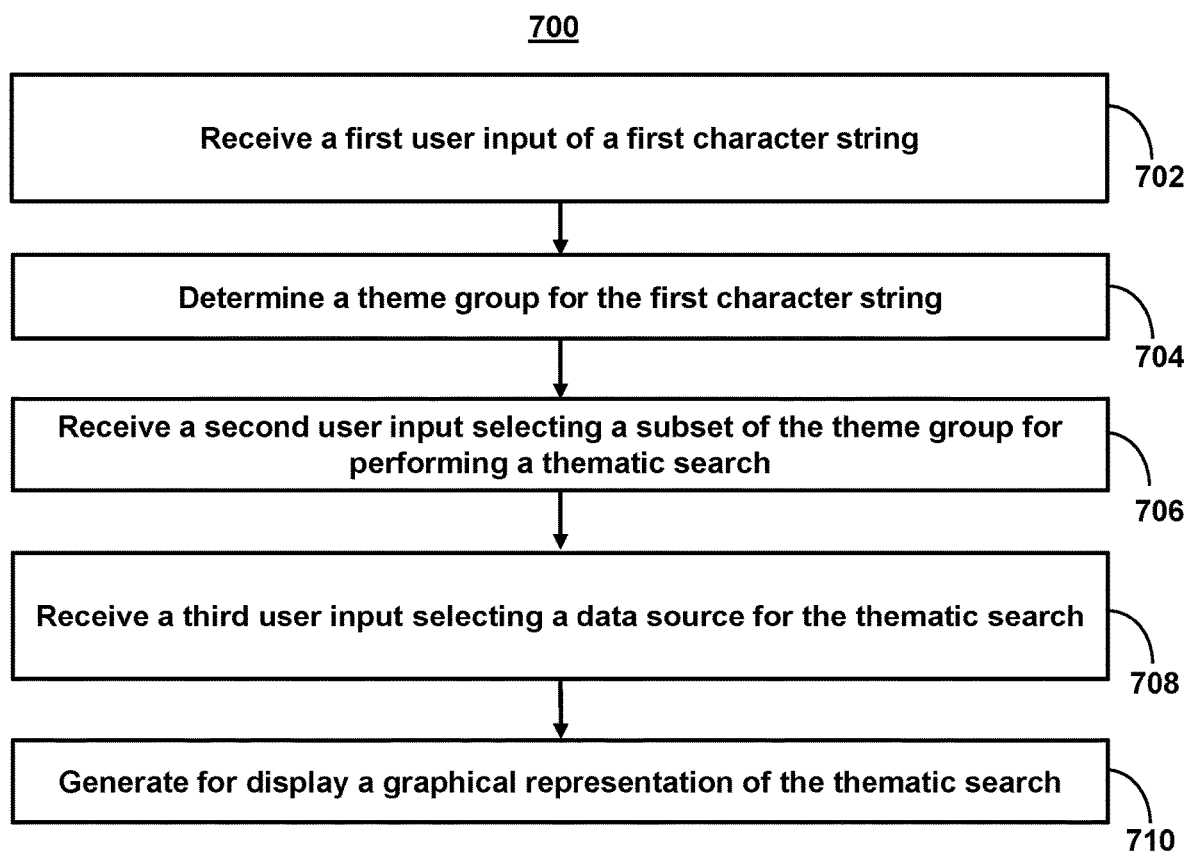
FIG. 7 shows a flowchart of the steps involved in presenting dynamic thematic relationships as a function of time, in accordance with one or more embodiments.

FIG. 6 shows a flowchart of the steps involved in presenting dynamic thematic relationships as a function of time, in accordance with one or more embodiments. For example, process 600 may represent the steps taken by one or more devices as shown in FIGS. 1-4. In some embodiments, process 600 may be combined with one or more steps of process 500 (FIG. 5) or process 700 (FIG. 7).

At step 602, process 600 determines (e.g., using control circuitry of one or more components of system 400 (FIG. 4)) a thematic search for a first character string query. For example, as described in step 514 of FIG. 5, the system may determine a thematic search of the first character string query over the first time period and the second time period based on the first theme group and the second theme group. For example, the thematic search may indicate a first frequency of the first theme group in the third data set during the first time period and a second frequency of the second theme group in the third data set during the second time period.

At step 604, process 600 determines (e.g., using control circuitry of one or more components of system 400 (FIG. 4)) whether or not to generate a composite thematic search. For example, the system may generate one or more presentations based on a thematic search of one or more character strings and/or a relationship between the character strings. For example, the system may generate a thematic search based on the presence of a first character string (e.g., a first word) and a second character string (e.g., a second word) in the same content (e.g., a webpage). Accordingly, the system may generate a composite thematic search. If process 600 determines to generate a composite thematic search, process 600 proceeds to step 606. If process 600 determines not to generate a composite thematic search, process 600 proceeds to step 610.

At step 606, process 600 determines (e.g., using control circuitry of one or more components of system 400 (FIG. 4)) a thematic search for a second character string query. For example, the system may determine a third theme group for the second character string query based on the first plurality of thematic relationships, wherein the third theme group corresponds to the first time period in a third data set. The system may also determine a fourth theme group for the second character string query based on the second plurality of thematic relationships, wherein the fourth theme group corresponds to the second time period in the third data set.

At step 608, process 600 generates (e.g., using control circuitry of one or more components of system 400 (FIG. 4)) a composite thematic search. For example, the system may generate for display (e.g., in user interface 100 (FIG. 1)) a thematic search of the first character string query and the second character string query over the first time period and the second time period based on the first theme group and the second theme group and the third theme group and the fourth theme group, respectively. In some embodiments, the system may store a library of thematic searches and/or character strings. A user may access the library to perform searches for different queries. Additionally or alternatively, the system may automatically run one or more searches automatically and/or at predetermined times or frequencies. For example, the system may continually run searches in the background of the system to generate alerts for one or more entities and/or subject matter. The composite search may include a category or group of searches.

At step 610, process 600 determines (e.g., using control circuitry of one or more components of system 400 (FIG. 4)) whether or not to filter the thematic search (or composite thematic search). For example, the system may allow a user to enter (e.g., via user interface 100 (FIG. 1)) criteria that may affect how the thematic search appears, what character strings are included in a theme group, and/or other criteria. For example, generating for display the thematic search of the first character string query over the first time period and the second time period based on the first theme group and the second theme group may also include receiving a user input for a filtering criterion for the thematic search and filtering the thematic search based on the filtering criterion. If process 600 determines to filter the thematic search, process 600 proceeds to step 612. If process 600 determines not to filter the thematic search, process 600 proceeds to step 616.

At step 612, process 600 receives (e.g., using control circuitry of one or more components of system 400 (FIG. 4)) filter criteria. For example, as shown in FIGS. 1-3, the system may generate the thematic search in a first window of the user interface (e.g., user interface 100 (FIG. 1)). The system may also generate a second window of the user interface that includes an option for modifying a criterion used to generate the thematic search. This criterion may include a filtering criterion. The system may also generate a third window of the user interface that comprises an option for modifying how the thematic search is displayed in the user interface. This option may also comprise a filtering criterion as the option may allow a user to edit the data or information related to the thematic search (e.g., a time range). The system may receive the filter criteria via one or more of these windows.

At step 614, process 600 filters (e.g., using control circuitry of one or more components of system 400 (FIG. 4)) the thematic search. For example, the system may modify how the thematic search is displayed (e.g., in a user interface) and/or may modify how the thematic search is displayed by the user interface. For example, in some embodiments, this may involve changing the scale, fonts, and/or other visual characteristics.

At step 616, process 600 displays (e.g., in user interface 100 (FIG. 1)) the thematic search. For example, the system may display the thematic search (or composite thematic search) based on the one or more options selected in process 600.

It is contemplated that the steps or descriptions of FIG. 6 may be used with any other embodiment of this disclosure. In addition, the steps and descriptions described in relation to FIG. 6 may be done in alternative orders, or in parallel to further the purposes of this disclosure. For example, each of these steps may be performed in any order, or in parallel, or substantially simultaneously to reduce lag or increase the speed of the system or method. Furthermore, it should be noted that any of the devices or equipment discussed in relation to FIGS. 1-4 could be used to perform one or more of the steps in FIG. 6.

FIG. 7 shows a flowchart of the steps involved in presenting dynamic thematic relationships as a function of time, in accordance with one or more embodiments. For example, process 700 may represent the steps taken by one or more devices as shown in FIGS. 1-4. In some embodiments, process 700 may be combined with one or more steps of process 500 (FIG. 5) or process 600 (FIG. 6). In some embodiments, process 700 may occur via user interface 100 (FIG. 1). For example, user interface 100 (FIG. 1) may include a graphical representation in a first portion of a user interface, an option for selecting the subset in a second portion of the user interface and an option for selecting the data source in a third portion of the user interface.

At step 702, process 700 receives (e.g., using control circuitry of one or more components of system 400 (FIG. 4)) a first user input of a first character string. For example, the system may receive a first user input of a first character string. In some embodiments, the system may store a library of thematic searches and/or character strings. A user may access the library to perform searches for different queries. Additionally or alternatively, the system may automatically run one or more searches automatically and/or at predetermined times or frequencies. For example, the system may continually run searches in the background of the system to generate alerts for one or more entities and/or subject matter.

At step 704, process 700 determines (e.g., using control circuitry of one or more components of system 400 (FIG. 4)) a theme group for the first character string. For example, the system may determine a theme group for the first character string, wherein the theme group comprises the first character string and a plurality of character strings having a thematic relationship to the first character string as determined by a machine learning model. For example, the machine learning model may be a supervised or unsupervised model that is trained to identify a plurality of thematic relationships between a plurality of character stings. In some embodiments, the system may use a classification model. For example, the system may input a labeled character string into the machine learning model and train the machine learning model to classify the labeled character string into a selected classification. In some embodiments, the system may use a clustering model. For example, the system may input a training set of character strings into the machine learning model, wherein the training set of character strings is unlabeled. The machine learning model may then group the training set of character strings based on thematic relationships using similarities between respective character strings of the training set of character strings. The trained model may then be used to determine theme groups for an inputted character string.

At step 706, process 700 receives (e.g., using control circuitry of one or more components of system 400 (FIG. 4)) a second user input selecting a subset of the theme group for performing a thematic search. For example, the system may receive a second user input selecting a subset of the theme group for performing a thematic search. It should be noted that the subset of character strings in the theme group may be dynamically changes and a resulting thematic search may change accordingly. For example, the system may receive a fourth user input modifying the subset and generate for display modified graphical representation based on the modifying subset.

At step 708, process 700 receives (e.g., using control circuitry of one or more components of system 400 (FIG. 4)) third user input selecting a data source for the thematic search. For example, the system may receive a third user input selecting a data source for the thematic search. For example, the system may allow a user to select a data source (e.g., a database from a particular entity (e.g., a government database, a digital archive of an entity, etc.) or a data source comprising a particular type of content (e.g., news articles, research publications, government business filings, etc.).

At step 710, process 700 generates for display (e.g., using control circuitry of one or more components of system 400 (FIG. 4)) a graphical representation of the thematic search. For example, the system may generate for display a graphical representation of the thematic search, wherein the graphical representation indicates a number of appearances, in the data source, of character strings in the subset as a function of time. For example, indicating the number of appearances, in the data source, of character strings in the subset as the function of time, may comprises determining a time when each of the character strings in the subset appeared in the data source and indicating, in the graphical representation, the time when each of the character strings in the subset appeared in the data source. For example, the time when each of the character strings in the subset appeared in the data source corresponds to a time when the each of the character strings was published in the data source (e.g., published on a webpage, news outlet, etc.).

In some embodiments, the system may receive a fourth user input selecting a criterion for the thematic search and filter the number of appearances based on the criterion. For example, the criterion may correspond to a sentiment or entity attributed to a character string in the subset. The system may filter the thematic search based on the sentiment attributed to the character string (and/or document in which the character string appears) in the thematic search, or the system may filter the thematic search based on the entity (e.g., a company, person, or thing) attributed to the character string (and/or document in which the character string appears) in the thematic search.

In some embodiments, the graphical representation may be selectable. For example, as discussed in FIG. 3 above, the system may receive a user input selecting a point in the graphical representation. The system may then retrieve information underlying the point and generating for display the information (e.g., supplemental content 304 (FIG. 3)) in a fourth portion of the user interface.

It is contemplated that the steps or descriptions of FIG. 6 may be used with any other embodiment of this disclosure. In addition, the steps and descriptions described in relation to FIG. 6 may be done in alternative orders, or in parallel to further the purposes of this disclosure. For example, each of these steps may be performed in any order, or in parallel, or substantially simultaneously to reduce lag or increase the speed of the system or method. Furthermore, it should be noted that any of the devices or equipment discussed in relation to FIGS. 1-4 could be used to perform one of more of the steps in FIG. 6.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method of identifying dynamic thematic relationship in temporally varying data sets using machine learning models, the method comprising: retrieving, using control circuitry, a first data set, wherein the first data set corresponds to a first time period; retrieving, using the control circuitry, a second data set, wherein the second data set corresponds to a second time period; receiving, using the control circuitry, a first character string query from a user; accessing, using the control circuitry, a machine learning model trained to: determine a first plurality of thematic relationships between a plurality of character strings at the first time period based on the first data set; and determine a second plurality of thematic relationships between the plurality of character strings at the second time period based on the second data set; determining, using the control circuitry, a first theme group for the first character string query based on the first plurality of thematic relationships, wherein the first theme group corresponds to the first time period in a third data set; determining, using the control circuitry, a second theme group for the first character string query based on the second plurality of thematic relationships, wherein the second theme group corresponds to the second time period in the third data set; and generating for display, on a user interface, a thematic search as a function of time of the first character string query over the first time period and the second time period based on the first theme group and the second theme group.

2. The method of embodiment 2, wherein the thematic search indicates a first frequency of the first theme group in the third data set during the first time period and a second frequency of the second theme group in the third data set during the second time period.

3. The method of embodiment 2 or 3, wherein a portion of the plurality of character strings in the first theme group are different from a portion of the plurality of character strings in the second theme group.

4. The method of any one of embodiment 1-3, wherein training the machine learning model further comprises: receiving a labeled character string; and training the machine learning model to classify the labeled character string into a selected classification.

5. The method of any one of embodiment 1-4, wherein training the machine learning model further comprises: retrieving the plurality of character strings, wherein the plurality of character strings are unlabeled; and grouping the plurality of character strings based on similarities between respective character strings of the plurality of character strings into the first plurality of thematic relationships and the second plurality of thematic relationships.

6. The method of any one of embodiment 1-5, wherein generating for display the thematic search of the first character string query over the first time period and the second time period based on the first theme group and the second theme group, further comprises: receiving a user input for a filtering criterion for the thematic search; and filtering the thematic search based on the filtering criterion.

7. The method of any one of embodiment 1-6, wherein generating for display the thematic search of the first character string query over the first time period and the second time period based on the first theme group and the second theme group, further comprises: receiving a second character string query from the user; and generating a composite thematic search based on the first character string query and the second character string query.

8. The method of any one of embodiment 1-7, wherein the thematic search is generated in a first window of the user interface, wherein a second window of the user interface includes an option for modifying criteria used to generate the thematic search, and wherein a third window of the user interface comprises an option for modifying how the thematic search is displayed in the user interface.

9. The method of any one of embodiment 1-8, further comprising: receiving a first user input selecting the first time period and the first data set; receiving a second user input selecting the second time period and the second data set; receiving a third user input selecting the third data set; and receiving a fourth user input selecting a third time period that comprises the first time period and the second time period.

10. The method of any one of embodiment 1-9, further comprising: retrieving a training frequency for the machine learning model; and selecting the first time period and the second time period based on the training frequency.

11. The method of any one of embodiment 1-10, further comprising: store a first data set, wherein the first data set corresponds to a first time period, and wherein first values of the first data set correspond to respective values published by a source in the first time period; and storing a second data set, wherein the second data set corresponds to a second time period, and wherein second values of the second data set correspond to respective values published by the source in the second time period.

12. The method of any one of embodiments 1-11, further comprising training the machine learning model to: determine the first plurality of thematic relationships between the plurality of character strings at the first time period based on the first data set; and determine the second plurality of thematic relationships between the plurality of character strings at the second time period based on the second data set.

13. A method of performing curated thematic searches, the method comprising: receiving a first user input of a first character string; determining a theme group for the first character string, wherein the theme group comprises the first character string and a plurality of character strings having a thematic relationship to the first character string as determined by a machine learning model; receiving a second user input selecting a subset of the theme group for performing a thematic search; receiving a third user input selecting a data source for the thematic search; and generating for display a graphical representation of the thematic search, wherein the graphical representation indicates a number of appearances, in the data source, of character strings in the subset as a function of time.

12. The method of embodiment 13, further comprising: receiving a fourth user input selecting a criterion for the thematic search; and filtering the number of appearances based on the criterion.

13. The method of embodiment 14, wherein the criterion corresponds to a sentiment or entity attributed to a character string in the subset.

14. The method of any one of embodiments 11-13, wherein indicating the number of appearances, in the data source, of character strings in the subset as the function of time, comprises: determining a time when each of the character strings in the subset appeared in the data source; and indicating, in the graphical representation, the time when each of the character strings in the subset appeared in the data source.

15. The method of any one of embodiments 11-14, wherein the time when each of the character strings in the subset appeared in the data source corresponds to a time when the each of the character strings was published in the data source.

16. The method of any one of embodiments 11-15, further comprising generating for simultaneous display: the graphical representation in a first portion of a user interface; an option for selecting the subset in a second portion of the user interface; and an option for selecting the data source in a third portion of the user interface.

17. The method of embodiment 16, further comprising: receiving a user input selecting a point in the graphical representation; retrieving information underlying the point; and generating for display the information in a fourth portion of the user interface.

18. The method of any one of embodiments 11-17, further comprising: receiving a fourth user input modifying the subset; and generating for display modified graphical representation based on the modifying subset.

19. The method of any one of embodiments 11-18, further comprising: inputting a labeled character string into the machine learning model; and training the machine learning model to classify the labeled character string into a selected classification.

20. The method of any one of embodiments 11-19, further comprising: inputting a training set of character strings into the machine learning model, wherein the training set of character strings is unlabeled; and grouping the training set of character strings based on thematic relationships using similarities between respective character strings of the training set of character strings.

21. A tangible, non-transitory, machine-readable medium storing instructions that, when executed by a data processing apparatus, cause the data processing apparatus to perform operations comprising those of any of embodiments 1-20.

22. A system comprising: one or more processors; and memory storing instructions that, when executed by the processors, cause the processors to effectuate operations comprising those of any of embodiments 1-20.

23. A system comprising means for performing any of embodiments 1-120.

24. A system comprising cloud-based circuitry for performing any of embodiments 1-20.

What is claimed is:

1. A system for identifying dynamic thematic relationships as a function of time using machine learning models, the system comprising:
   cloud-based storage circuitry configured to:
      store a first data set, wherein the first data set corresponds to a first time period, and wherein first values of the first data set correspond to respective values published by a source in the first time period; and
      store a second data set, wherein the second data set corresponds to a second time period, and wherein second values of the second data set correspond to respective values published by the source in the second time period;
   cloud-based control circuitry configured to:
      receive a first character string query from a user;
      access a machine learning model trained to:
         determine a first plurality of thematic relationships between a plurality of character strings at the first time period based on the first data set; and determine a second plurality of thematic relationships between the plurality of character strings at the second time period based on the second data set;

determining a first theme group for the first character string query based on the first plurality of thematic relationships, wherein the first theme group corresponds to the first time period in a third data set; and determining a second theme group for the first character string query based on the second plurality of thematic relationships, wherein the second theme group corresponds to the second time period in the third data set, and wherein a portion of the plurality of character strings in the first theme group are different from a portion of the plurality of character strings in the second theme group; and cloud-based I/O circuitry configured to:

generate for display a thematic search as a function of time of the first character string query over the first time period and the second time period based on the first theme group and the second theme group, wherein the thematic search indicates a first frequency of the first theme group in a third data set during the first time period and a second frequency of the second theme group in the third data set during the second time period.

2. A method of identifying dynamic thematic relationships as a function of time using machine learning models, the method comprising:

receiving, using the control circuitry, a first character string query from a user;

accessing, using the control circuitry, a machine learning model trained to:

determine a first plurality of thematic relationships between a plurality of character strings at a first time period based on a first data set; and determine a second plurality of thematic relationships between the plurality of character strings at a second time period based on a second data set;

determining, using the machine learning model, a first theme group for the first character string query based on the first plurality of thematic relationships, wherein the first theme group corresponds to the first time period in a third data set;

determining, using the machine learning model, a second theme group for the first character string query based on the second plurality of thematic relationships, wherein the second theme group corresponds to the second time period in the third data set; and generating for display, on a user interface, a thematic search as a function of time of the first character string query over the first time period and the second time period based on the first theme group and the second theme group.

3. The method of claim 2, wherein the thematic search indicates a first frequency of the first theme group in the third data set during the first time period and a second frequency of the second theme group in the third data set during the second time period.

4. The method of claim 2, wherein training the machine learning model further comprises:

receiving a labeled character string; and training the machine learning model to classify the labeled character string into a selected classification.

5. The method of claim 2, wherein training the machine learning model further comprises:

retrieving the plurality of character strings, wherein the plurality of character strings are unlabeled; and grouping the plurality of character strings based on similarities between respective character strings of the plurality of character strings into the first plurality of thematic relationships and the second plurality of thematic relationships.

6. The method of claim 2, wherein generating for display the thematic search of the first character string query over the first time period and the second time period based on the first theme group and the second theme group, further comprises:

receiving a user input for a filtering criterion for the thematic search; and filtering the thematic search based on the filtering criterion.

7. The method of claim 2, wherein generating for display the thematic search of the first character string query over the first time period and the second time period based on the first theme group and the second theme group, further comprises:

receiving a second character string query from the user; and generating a composite thematic search based on the first character string query and the second character string query.

8. The method of claim 2, wherein the thematic search is generated in a first window of the user interface, wherein a second window of the user interface includes an option for modifying criteria used to generate the thematic search, and wherein a third window of the user interface comprises an option for modifying how the thematic search is displayed in the user interface.

9. The method of claim 2, further comprising:

receiving a first user input selecting the first time period and the first data set;

receiving a second user input selecting the second time period and the second data set;

receiving a third user input selecting the third data set; and receiving a fourth user input selecting a third time period that comprises the first time period and the second time period.

10. The method of claim 2, further comprising:

retrieving a training frequency for the machine learning model; and selecting the first time period and the second time period based on the training frequency.

11. A method of performing curated thematic searches, the method comprising:

receiving, using a control circuitry, a first user input of a first character string;

determining, using the control circuitry, a theme group for the first character string, wherein the theme group comprises the first character string and a plurality of character strings having a thematic relationship to the first character string as determined by a machine learning model;

receiving, using the control circuitry, a second user input selecting a subset of the theme group for performing a thematic search;

receiving, using the control circuitry, a third user input selecting a data source for the thematic search; and generating for display, using the control circuitry, a graphical representation of the thematic search, wherein the graphical representation indicates a number of appearances, in the data source, of character strings in the subset as a function of time.

12. The method of claim 11, further comprising:
receiving a fourth user input selecting a criterion for the thematic search; and
filtering the number of appearances based on the criterion.

13. The method of claim 12, wherein the criterion corresponds to a sentiment or entity attributed to a character string in the subset.

14. The method of claim 11, wherein indicating the number of appearances, in the data source, of character strings in the subset as the function of time, comprises:
determining a time when each of the character strings in the subset appeared in the data source; and
indicating, in the graphical representation, the time when each of the character strings in the subset appeared in the data source.

15. The method of claim 11, wherein the time when each of the character strings in the subset appeared in the data source corresponds to a time when the each of the character strings was published in the data source.

16. The method of claim 11, further comprising generating for simultaneous display:
the graphical representation in a first portion of a user interface;
an option for selecting the subset in a second portion of the user interface; and
an option for selecting the data source in a third portion of the user interface.

17. The method of claim 16, further comprising:
receiving a user input selecting a point in the graphical representation;
retrieving information underlying the point; and
generating for display the information in a fourth portion of the user interface.

18. The method of claim 11, further comprising:
receiving a fourth user input modifying the subset; and
generating for display modified graphical representation based on the modifying subset.

19. The method of claim 11, further comprising:
inputting a labeled character string into the machine learning model; and
training the machine learning model to classify the labeled character string into a selected classification.

20. The method of claim 11, further comprising:
inputting a training set of character strings into the machine learning model, wherein the training set of character strings is unlabeled; and
grouping the training set of character strings based on thematic relationships using similarities between respective character strings of the training set of character strings.

* * * * *